US010451206B2

(12) United States Patent
Espinasse et al.

(10) Patent No.: US 10,451,206 B2
(45) Date of Patent: Oct. 22, 2019

(54) CONNECTION END-PIECE OF A FLEXIBLE PIPE FOR TRANSPORTING FLUID AND ASSOCIATED METHOD

(71) Applicant: TECHNIP FRANCE, Courbevoie (FR)

(72) Inventors: Philippe François Espinasse, Bihorel (FR); René Antoine Maloberti, Champigny sur Marne (FR); Jean-Christophe Bourget, Mont Saint Aignan (FR); Guillaume Chaudet, Malaunay (FR)

(73) Assignee: TECHNIP FRANCE (FR)

( * ) Notice: Subject to any disclaimer, the term of this patent is extended or adjusted under 35 U.S.C. 154(b) by 715 days.

(21) Appl. No.: 14/654,285

(22) PCT Filed: Dec. 20, 2013

(86) PCT No.: PCT/EP2013/077857
§ 371 (c)(1),
(2) Date: Jun. 19, 2015

(87) PCT Pub. No.: WO2014/096429
PCT Pub. Date: Jun. 26, 2014

(65) Prior Publication Data
US 2015/0345680 A1    Dec. 3, 2015

(30) Foreign Application Priority Data
Dec. 21, 2012  (FR) ...................... 12 62692

(51) Int. Cl.
*F16L 33/01*  (2006.01)
*F16L 11/20*  (2006.01)
(Continued)

(52) U.S. Cl.
CPC ............... *F16L 33/01* (2013.01); *F16L 11/20* (2013.01); *F16L 21/00* (2013.01);
(Continued)

(58) Field of Classification Search
CPC ......... F16L 33/01; F16L 33/221; F16L 33/28; F16L 33/24
(Continued)

(56) References Cited

U.S. PATENT DOCUMENTS 2,858,147 A * 10/1958 Guarnaschelli ......... F16L 33/26
                                                              285/222.5
3,140,106 A *  7/1964 Thomas .................. F16L 33/01
                                                              285/222.4
(Continued)

FOREIGN PATENT DOCUMENTS

EP     0 241 656 A1    10/1987
EP     0 264 587 A2     4/1988
(Continued)

OTHER PUBLICATIONS

International Search Reort dated Feb. 7, 2014 issued in corresponding International patent application No. PCT/EP2013/077857.
(Continued)

*Primary Examiner* — Aaron M Dunwoody
(74) *Attorney, Agent, or Firm* — Ostrolenk Faber LLP (57) ABSTRACT

A connection end-piece of a flexible pipe includes an end vault extending along a central axis; an outer cover fixed to the end vault and defining, with the end vault, a reception chamber for receiving an end section of the armor elements of the flexible pipe; at least one annular member applied externally to the armor elements of the flexible pipe, the annular member being at least partially accommodated in the reception chamber between the armor elements and the outer cover. The annular member applies a radial tightening pressure higher than 100 bars onto the armor elements toward the central axis of the flexible pipe.

19 Claims, 7 Drawing Sheets

(51) Int. Cl.
*F16L 21/00* (2006.01)
*F16L 33/207* (2006.01)
*F16L 33/22* (2006.01)
*F16L 33/32* (2006.01)
*F16L 33/28* (2006.01)
*F16L 33/34* (2006.01)

(52) U.S. Cl.
CPC ....... *F16L 33/2073* (2013.01); *F16L 33/2078* (2013.01); *F16L 33/222* (2013.01); *F16L 33/28* (2013.01); *F16L 33/32* (2013.01); *F16L 33/34* (2013.01)

(58) Field of Classification Search
USPC .......................................... 285/222.1–222.5
See application file for complete search history.

(56) References Cited

U.S. PATENT DOCUMENTS

| | | | | |
|---|---|---|---|---|
| 3,191,975 | A * | 6/1965 | La Marre | F16L 33/221 |
| | | | | 285/243 |
| 3,306,637 | A * | 2/1967 | Press | F16L 33/01 |
| | | | | 285/222.1 |
| 3,667,112 | A * | 6/1972 | Chevalier | F16L 33/2076 |
| | | | | 29/508 |
| 3,936,118 | A * | 2/1976 | Thiery | F16L 33/01 |
| | | | | 285/222.4 |
| 4,033,612 | A * | 7/1977 | Chevalier | F16L 11/083 |
| | | | | 285/222.4 |
| 4,191,217 | A * | 3/1980 | Kadono | F16L 33/01 |
| | | | | 138/109 |
| 4,634,153 | A | 1/1987 | Kishton | |
| 4,875,717 | A | 10/1989 | Policelli | |
| 4,950,001 | A | 8/1990 | Briggs | |
| 4,988,182 | A * | 1/1991 | Takahashi | G02C 7/061 |
| | | | | 351/159.42 |
| 6,019,137 | A * | 2/2000 | Secher | F16L 33/01 |
| | | | | 137/601.01 |
| 8,079,619 | B2 * | 12/2011 | Witz | F16L 33/01 |
| | | | | 285/222.2 |
| 2004/0212191 | A1 * | 10/2004 | Segal | F16L 19/0286 |
| | | | | 285/334.5 |
| 2009/0140517 | A1 * | 6/2009 | Eccleston | F16L 33/01 |
| | | | | 285/222.5 |
| 2009/0160184 | A1 * | 6/2009 | Vo | E21B 17/04 |
| | | | | 285/249 |
| 2013/0241197 | A1 * | 9/2013 | Espinasse | F16L 33/01 |
| | | | | 285/222.1 |
| 2014/0049039 | A1 * | 2/2014 | Karabelas | F16L 33/01 |
| | | | | 285/222.1 |
| 2015/0143878 | A1 * | 5/2015 | Clevelario | F16L 33/01 |
| | | | | 73/49.5 |
| 2016/0016708 | A1 * | 1/2016 | Le Blan | B65D 59/06 |
| | | | | 138/96 R |
| 2016/0053928 | A1 * | 2/2016 | Roberts | F16L 17/08 |
| | | | | 277/314 |
| 2016/0069494 | A1 * | 3/2016 | Paulo | B21C 37/12 |
| | | | | 285/399 |
| 2016/0123505 | A1 * | 5/2016 | Damiens | F16L 11/083 |
| | | | | 138/133 |
| 2016/0290539 | A1 * | 10/2016 | Nielsen | F16L 33/01 |
| 2016/0362942 | A1 * | 12/2016 | Bertoni | E21B 19/002 |

FOREIGN PATENT DOCUMENTS

| | | |
|---|---|---|
| EP | 1 867 905 A1 | 12/2007 |
| WO | WO 03/004921 A1 | 1/2003 |
| WO | WO 2007/144553 | 12/2007 |
| WO | WO 2008/037867 A1 | 4/2008 |

OTHER PUBLICATIONS

French Search Report dated Sep. 25, 2013 issued in corresponding French Application No. FR 12 62692.

\* cited by examiner

CONNECTION END-PIECE OF A FLEXIBLE PIPE FOR TRANSPORTING FLUID AND ASSOCIATED METHOD

CROSS-REFERENCE TO RELATED APPLICATIONS

The present application is a 371 National Phase of International Application No. PCT/EP2013/077857, filed Dec. 20, 2013, which claims benefit of French Application No. 12 62692, filed Dec. 21, 2012, the content of which are incorporated herein by reference.

TECHNICAL FIELD OF THE INVENTION

The present invention relates to a connection end-piece for connecting a flexible pipe for transporting fluid, comprising:
  at least one pressure sheath and at least one tensile armour layer disposed externally relative to the pressure sheath, the end-piece comprising:
  an end vault extending along a central axis;
  an exterior cover fastened on to the end vault and delimiting with the end vault, a reception chamber for receiving an end section of the reinforcing armour elements;
  at least one annular member applied externally over the reinforcing armour elements of a reinforcing armour layer, the annular member being accommodated at least partially in the reception chamber between the reinforcing armour elements and the exterior cover. The pipe is in particular a flexible pipe of a type that is not bonded ("unbonded") intended for use in the transportation of hydrocarbons through a body of water, such as an ocean, a sea, a lake or a river.

BACKGROUND OF THE INVENTION

Such a flexible pipe is for example fabricated in accordance with the documents relating to the standards API 17J (Specification for Unbonded Flexible Pipe) and API RP 17B (Recommended Practice for Flexible Pipe) established by the American Petroleum Institute.

The pipe is generally formed of a plurality of layers that are concentric and superposed. It is considered "unbonded" within the scope and purpose of the present invention since at least one of the layers of the pipe is capable of moving longitudinally in relation to the adjacent layers during the bending or flexion of the pipe. In particular, an unbonded pipe is a pipe that is free of any bonding materials that connect the layers forming the pipe.

The pipe is generally disposed across a body of water, between a bottom assembly, designed for collecting the fluid used at the bottom of the body of water and a floating surface assembly designed for collecting and distributing the fluid. The surface assembly may be a semi-submersible platform, an FPSO (Floating Production Storage and Offloading unit) or another floating unit.

In certain cases, for enabling the operational use of the fluids in deep waters, the flexible pipe has a length greater than 800 m. The ends of the pipe have end-pieces to be used for the connection to the bottom assembly and the surface assembly.

These pipe lines are subjected to very high axial tensile forces, in particular when the body of water in which the pipe is disposed is extremely deep.

In this case, the upper end-piece that connects the pipe to the surface assembly must absorb a very high degree of axial tension, which can reach several hundreds of tonnes. These forces are transmitted to the end-piece by means of the tensile armour layers extending along the pipe.

The axial tension not only has a high mean value, but also presents continuous and ongoing variations as a function of the vertical movements of the surface assembly of the pipe, under the effect of the agitation of the body of water brought about by the swell or by the waves.

The variations in axial tension may reach several tens of tonnes and be repeated on a continual basis during the service life of the pipe. Over a period of 20 years, the number of cycles thus may well go up to more than 20 million.

It is therefore necessary to ensure that the attachment between the layers of tensile armour and the body of the end-piece is particularly robust.

The patent document WO 2007/144553 describes an end-piece of the aforementioned type, wherein the reinforcing armour wires diverge in a helical manner away from the axis of the pipe, and then converge together in a helical manner towards the axis of the pipe in the chamber delimited by the end vault and the cover of the end-piece. This results in a "capstan" like effect, which locks the armour wires into position in the end-piece.

However, such an end-piece is not entirely satisfactory. In order to assemble the end-piece, it is necessary to move the armour wires away from the axis of the pipe, and then to bring them close together towards the axis of the pipe, which results in a hardening of each armour wire at the point of separation. This hardening is quite likely to lead to a localised weakening of the bond, which may prove to be detrimental over the course of time, in particular when the end-piece is subjected to repetitive variations in axial tension.

In order to alleviate this drawback, the document WO 2007/144553 proposes to arrange a collar around the reinforcing armouring without unduly tightening it so as to limit the radial deformation of each armour wire during the assembly.

Such a solution is however not sufficient in some cases, in particular when the pipe gets subjected to a number of cycles of axial tension variations.

SUMMARY OF THE INVENTION

An object of the invention is therefore to obtain an end-piece that ensures effective absorption of axial tension, not only for high mean values of axial tension, but also when numerous cycles of axial tension variation are applied to the pipe.

To this end, the subject-matter of the invention relates to an end-piece of the aforementioned type, characterised in that the annular member applies over the reinforcing armour elements a radial clamping pressure towards the central axis that is greater than 100 bars.

The end-piece according to the invention may comprise one or more of the following characteristic features, taken into consideration in isolation or in accordance with any technically possible combination:
  the length of the annular member, taken along the central axis, is greater than 200 mm;
  the coefficient of friction between the reinforcing armour elements and the annular member is greater than 0.1, and is in particular greater than 0.3;

it includes an intermediate friction layer radially interposed between the reinforcing armour elements and the annular member and/or between the annular member and the cover;

the reinforcing armour elements have, positioned to face the annular member, an exterior exposed surface placed directly in contact with the intermediate friction layer;

the cover extends axially between a front edge fixed on to the end vault and a rear edge disposed away from the end vault, the annular member extending axially away from the end vault in the vicinity of the rear edge;

it comprises a front sealing assembly around the pressure sheath, the front sealing assembly being offset axially away from the annular member in the vicinity of the end vault;

the annular member has an interior peripheral surface that is substantially cylindrical around the central axis, with the reinforcing armour elements each having an end section extending into a cylindrical casing envelope arranged facing the internal peripheral surface;

the free end of each armour element extends axially to be facing the annular member, advantageously radially towards the interior relative to the annular member, the reception chamber being possibly free of any filler material;

at least one free portion of an end section of an armour element protrudes out axially towards the end vault beyond the annular member into the reception chamber, the free portion being embedded in a filler material disposed in the reception chamber;

the free portion extends away radially from the central axis and/or radially approaches the central axis and/or has an anchoring element disposed in the filler material;

the annular member is held in position axially relative to the end vault by being in engagement axially with the end vault or/and by being in engagement radially towards the exterior with the cover;

the annular member is selected from a clamping collar having an interior circumferential surface that is substantially continuous about the central axis, a deformed ring or an assembly comprising an interior ring and an exterior ring clamping the interior ring radially toward the central axis by means of a wedge effect.

The subject-matter of the invention also relates to a connection end-piece of a flexible pipe for transporting fluid, the flexible pipe comprising at least one pressure sheath and at least one layer of tensile armour disposed externally relative to the pressure sheath, the end-piece comprising:

an end vault extending along a central axis;

an exterior cover fastened on to the end vault and delimiting with the end vault, a reception chamber for receiving an end section of the reinforcing armour elements;

at least one annular member applied externally on to the reinforcing armour elements of a reinforcing armour layer, the annular member being accommodated at least partially in the reception chamber between the reinforcing armour elements and the exterior cover;

characterised in that the annular member applies on to the reinforcing armour elements a radial clamping pressure for clamping towards the central axis;

and in that at least one free portion of an end section of an armour element protrudes out axially towards the end vault beyond the annular member into the reception chamber, the free portion being embedded in a filler material disposed in the reception chamber.

In this case, the annular member does not necessarily apply on the reinforcing armour elements a radial clamping pressure towards the central axis greater than 100 bars, this radial clamping pressure may possibly be less than or equal to 100 bars, for example comprised between 50 bars and 100 bars.

Preferably, the annular member of this end-piece then partially absorbs the axial tension transmitted by the layer or layers of reinforcing armouring. It absorbs, for example between 15% and 50% of the axial tension transmitted by the layer or layers of reinforcing armouring.

The end-piece according to the invention may further comprise one or more of the characteristic features outlined above, taken into consideration in isolation or in accordance with any technically possible combination.

The subject-matter of the invention also relates to a mounting method for mounting such an end-piece as described above, characterised in that it includes the following steps:

provision of a pipe end including a pressure sheath disposed around the pressure sheath;

provision of the annular member around and on the exterior of the end sections of the reinforcing armour elements of a reinforcing armour layer;

clamping of the annular member in order to apply on the end sections a radial pressure towards the central axis greater than 100 bars;

setting in position of a cover and an end vault around the annular member in order to define a reception chamber for receiving the free ends of the reinforcing armour elements, and at least in part the annular member.

The method according to the invention may include one or more of the following characteristic features, taken into consideration in isolation or in accordance with any technically possible combination:

it includes a step of interposing of an intermediate friction layer between the annular member and the reinforcing armour elements prior to the clamping of the annular member;

after the step of clamping, a free portion of at least one armour element protrudes out axially towards the end vault beyond the annular member into the reception chamber, the method comprising the injection of a filler material that is capable of solidifying in the reception chamber in order to embed the free portion.

BRIEF DESCRIPTION OF THE DRAWINGS

The invention will be better understood upon reading the description which will follow, given solely by way of example, and with reference being made to the accompanying drawings, in which.

DESCRIPTION OF EMBODIMENTS

In the following sections, the terms "exterior" and "interior" are to be understood generally in a radial manner relative to an axis A-A' of the pipe, the term "exterior" is to be understood as being relatively further away radially from the axis A-A' and the term "interior" is to be understood as being relatively closer radially to the axis A-A' of the pipe.

The terms "front" and "rear" are to be understood in a radial manner relative to an axis A-A' of the pipe, the term "front" is to be understood as being relatively further away from the middle of the pipe and closer to one of the ends thereof, the term "rear" is to be understood as being relatively closer to the middle of the pipe and further away from one of the ends thereof. The middle of the pipe is the point of the pipe located equidistant from the two ends thereof.

Figure 1:
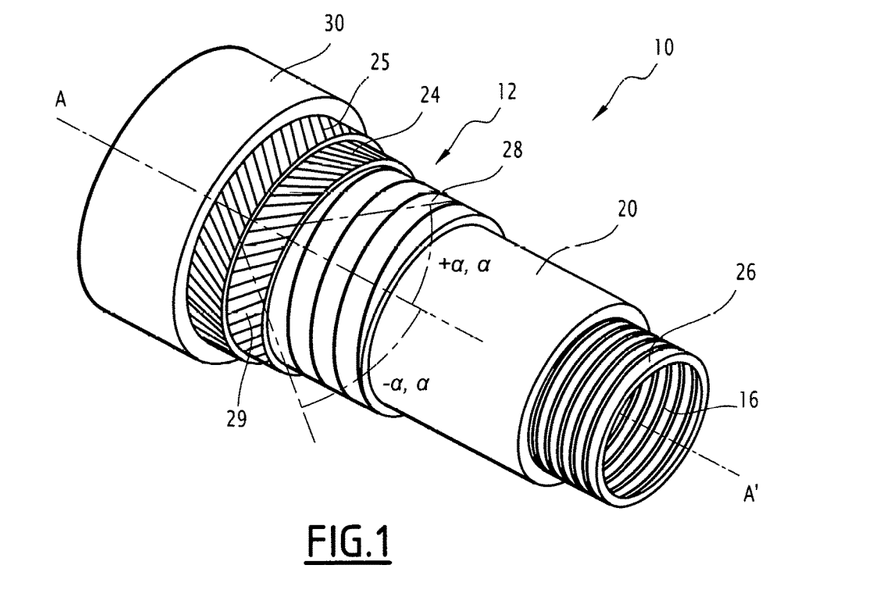
FIG. 1 is a partially stripped down view in perspective of a section of a flexible pipe on which is mounted an end-piece according to the invention.
Figure 2:
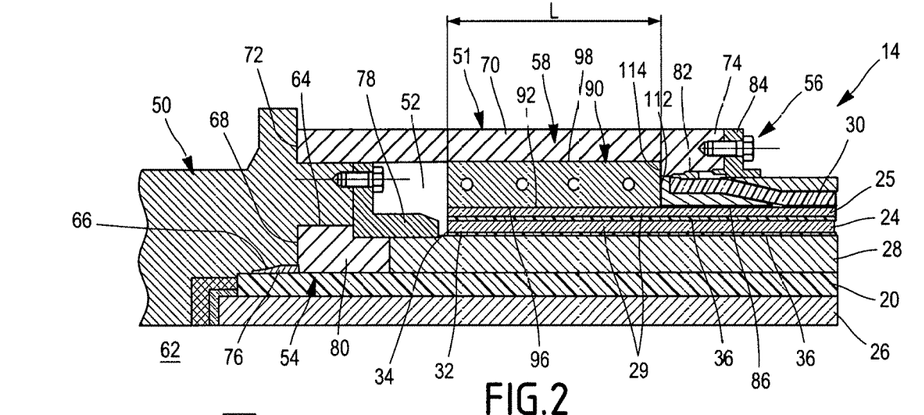
FIG. 2 is a simplified schematic view, taken in cross section along a median axial plane, of the relevant portions of a first end of a flexible pipe according to the invention.

A first flexible pipe 10 according to the invention is partially illustrated in FIG. 1 and FIG. 2.

The flexible pipe 10 comprises a central section 12 illustrated in part in FIG. 1. It comprises, at each of the axial ends of the central section 12, an end-piece 14 (not visible in FIG. 1), the relevant parts of which are represented in FIG. 2.

With reference to FIG. 1, the pipe 10 delimits a central passage 16 for circulation of a fluid, advantageously a petroleum fluid. The central passage 16 extends along an axis A-A', between the upstream end and the downstream end of the pipe 10. It opens out through the end-pieces 14.

The flexible hose 10 is intended to be disposed across a body of water (not shown) and in an installation for prospecting and exploitation of fluids, in particular hydrocarbons.

The body of water is, for example, a sea, a lake or an ocean. The depth of the body of water is, for example, between 500 m and 3,000 m.

The fluid prospecting and exploitation installation includes a surface assembly in particular a floating assembly and a bottom assembly (not represented) which are generally connected to each other by the flexible pipe 10.

The flexible pipe 10 is preferably a pipe that is "unbonded".

At least two adjacent layers of the flexible pipe 10 are free to move longitudinally in relation to each other upon the bending or flexion of the pipe. Advantageously, all of the layers of the flexible pipe are free to move relative to the other. Such a pipe is described for example in the documents relating to the standards API 17J and API RP17B, published by the American Petroleum Institute (API).

As illustrated in the FIG. 1, the pipe 10 delimits a plurality of concentric layers around the axis A-A', which extend continuously along the central section 12 up to the end-pieces 14 situated at the ends of the pipe.

According to the invention, the pipe 10 comprises at least one first sheath 20 made of polymer based material that advantageously constitutes a pressure sheath.

The pipe 10 further comprises at least one tensile armour layer 24, 25 disposed externally relative to the first sheath 20.

Advantageously, and according to the desired use, the pipe 10 in addition comprises an internal carcass 26 disposed on the interior of the pressure sheath 20, a pressure vault 28 interposed between the pressure sheath 20 and the layer or layers of tensile armour 24, 25 and an exterior sheath 30, designed to ensure the protection of the pipe 10.

In a known manner, the pressure sheath 20 is designed to be used for confining in a sealed manner the transported fluid in the passage 16. It is formed of polymer material, for example based on a polyolefin such as polyethylene, based on a polyamide such as PA11 or PA12, or based on a fluorinated polymer such as polyvinylidene fluoride (PVDF).

The thickness of the pressure sheath 20 is for example comprised between 5 mm and 20 mm.

The carcass 26, when it is present, is formed for example of a profiled metal strip that is wound in a spiral. The spiral windings of the strip are advantageously interlocked into each other, which allows for absorbing the radial crushing forces.

In this example, the carcass 26 is disposed within the interior of the pressure sheath 20. The pipe is then referred to as "rough bore" as per the accepted English terminology on account of the geometry of the carcass 26.

By way of a variant (not shown), the flexible pipe 10 is free of any internal carcass 26, it is then referred to as "smooth bore" as per the accepted English terminology.

The helical winding of the profiled metal sheet forming the carcass 26 is short pitched that is to say that it has a helix angle having an absolute value close to 90°, typically comprised between 75° and 90°.

In this example, the pressure vault 28 is designed to absorb the forces related to the pressure prevailing within the interior of the pressure sheath 20. It is for example formed of a metal profiled wire wound helically around the sheath 20. The profiled wire generally has a complex geometry, in particular having a form shaped like a Z, T, U, K, X or I.

The pressure vault 28 is helically wound with a short pitch around the pressure sheath 20, that is to say, with a helix angle having an of absolute value close to 90°, typically comprised between 75° and 90°.

The flexible pipe 10 according to the invention comprises at least one armour layer 24, 25 formed of a helical winding of at least one elongated armour element 29.

In the example shown in FIG. 1, the flexible pipe 10 includes a plurality of reinforcing armour layers 24, 25, in particular an interior armour layer 24, applied on to the pressure vault 28 (or on the sheath 20 when the vault 28 is absent) and an exterior reinforcing armour layer 25 around which is disposed the exterior sheath 30.

Each armour layer 24, 25, includes longitudinal reinforcing armour elements 29 wound with a long pitch around the axis A-A' of the pipe.

The term "wound with a long pitch", is used to indicate that the absolute value of the helix angle is less than 60°, and is typically comprised between 25° and 55°.

The reinforcing armour elements 29 of a first armour layer 24 are generally wound at an angle in the opposite direction relative to the armour elements 29 of a second armour layer 25. Thus, if the winding angle of the reinforcing armour elements 29 of the first layer 24 is equal to +α, α being comprised between 25° and 55°, the winding angle of the reinforcing armour elements 29 of the second armour layer 25 disposed in contact with the first armour layer 24 is for example −α, with α comprised between 25° and 55°.

The reinforcing armour elements 29 are for example formed by metal wires, or strips.

As will be discussed below, the reinforcing armour elements 29 each have an end section 32 inserted into the end-piece 14. The end section 32 extends up to a free end 34 disposed within the end-piece 14. It advantageously presents a helical or pseudo-helical trajectory path with axis A-A' in the end-piece 14.

In this example, each layer of reinforcing armour 25, 26 is provided with at least one anti-wear strip 36 on which the layer 25, 26 is supported. The anti-wear strip 36 is for example made of plastic.

In the example shown in FIG. 2, the anti-wear strip 36 extends up to the free end 34 of each armour element 29. By way of a variant, as will be discussed farther below, the end section 32 of each armour element 29 is stripped so as to be free of any anti-wear strip.

The exterior sheath 30 is intended to prevent the permeation of fluid from the exterior of the flexible pipe to the interior. It is advantageously made of polymer material, in particular based on a polyolefin, such as polyethylene, based on a polyamide, such as the PA11 or PA12, or based on a fluorinated polymer such as polyvinylidene fluoride (PVDF).

The thickness of the exterior sheath 30 is for example comprised between 5 mm and 15 mm.

As illustrated in FIG. 2, each end-piece 14 has an end vault 50 and an exterior connecting cover 51 protruding out axially towards the rear from the end vault 50. The cover 51 delimits, with the end vault 50, a reception chamber 52 for receiving the free ends 34 of the armour elements 29.

The end-piece 14 further also comprises a front sealing assembly 54 around the pressure sheath 20, and a rear sealing assembly 56 around the exterior sheath 30.

The end-piece 14 in addition comprises a fastening assembly 58 for fastening of the armour layers 24, 25 in the chamber 52.

In this example, the end vault 50 is intended for connecting the pipe 10 to another connection end-piece 14 or to the terminal equipment units, advantageously by means of an end flange (not shown).

The end vault 50 has a central bore 62 designed for receiving the end of the first sheath 20 and for permitting the flow of fluid flowing through the central passage 16 to the exterior of the pipe 10.

In the example shown in FIG. 2, the end vault 50 internally defines a rear surface 64 delimiting a converging support surface 66 for supporting a crimping ring and an insertion housing 68 for inserting a rear stop ring.

The cover 51 comprises a tubular peripheral wall 70 extending around the axis A-A'. The peripheral wall 70 has a front edge 72 secured on to the end vault 50, diverging or moving away radially from the armour layers 24, 25 and a rear edge 74 extending axially towards the rear beyond the end vault 50.

The cover 51 delimits the chamber 52 radially towards the exterior. The rear surface 64 of the end vault 50 axially delimits the chamber 52 towards the front.

The front sealing assembly 54 is advantageously situated at the front of the end-piece 14, in contact with the end vault 50, while being offset axially towards the front relative to the fastening assembly 58, and relative to the downstream sealing assembly 56.

The front sealing assembly 54 comprises a front crimping ring 76, designed to come into engagement on the pressure sheath 20, and a front clamping flange 78 for clamping the front crimping ring 76.

In the example shown in FIG. 2, in which the pipe 10 includes a pressure vault 28, the front assembly 54 in addition comprises an intermediate stop ring 80 for the pressure vault 28, interposed between the crimping ring 76 and the front clamping flange 78.

The crimping ring 76 is thus wedged on the converging or tapered surface 66 and is compressed by the clamping flange 78 for crimping the sheath 20.

Figure 3:
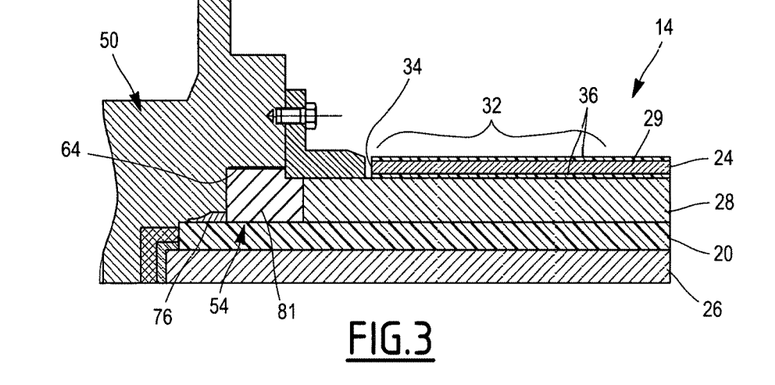
FIG. 3 is a view of a detail of a front crimping variant of the pressure sheath of the first end-piece according to the invention.

In the variant represented in FIG. 3, the front crimping ring 76 is arranged in direct support on to the front clamping flange 81 without any intermediate piece between the two.

The rear sealing assembly 56 is disposed at the rear of the fastening assembly 58. It includes a rear crimping ring 82, a rear clamping flange 84, and advantageously, an intermediate support cannula 86 interposed between the exterior sheath 30 and the reinforcing armour layers 24, 25.

The rear crimping ring 82 is interposed between a rear surface of the cover 51 and the exterior sheath 30.

The rear clamping flange 84 is fastened on to the rear edge 74 of the cover 51. It pushes forward the rear crimping ring 82 towards the front in order to compress and crimp the exterior sheath 30.

The exterior sheath 30 is supported on the intermediate cannula 86. It is wedged axially to the rear of the fastening assembly 58.

According to the invention, the fastening assembly 58 comprises at least one annular clamping member 90 for clamping the armour layers 24, 25 applying a radial pressure P that is greater than 100 bars on the armour layers 24, 25. It preferably comprises at least one intermediate friction layer 92 disposed between the annular member 90 and the exterior layer of reinforcing armour 25, and/or between the annular member 90 and the cover 51 and/or between layers of reinforcing armour 24, 25.

According to the invention, the annular clamping member 90 applies on to the armour layers 24, 25, a radial pressure P directed towards the axis A-A' that is greater than 100 bars, in particular greater than 150 bars, for example between 180 bars and 250 bars.

This radial pressure is applied over an active length L which, in this example corresponds to the length of the annular member 90, taken along the axis A-A'.

With reference to FIGS. 2, and 12 to 14, the annular clamping member 90 comprises a tubular body 94 with axis A-A' having an interior peripheral bearing surface 96 on the end sections 32 of the reinforcing armour elements 29 of the armour layer 25, and an exterior peripheral surface 98, intended for making the axial connection with the cover 51.

In the example represented in FIG. 2, the interior peripheral surface 96 is cylindrical with axis A-A'. It maintains in place the end sections 32 of the reinforcing armour elements 29 in a cylindrical casing envelope, in a manner such that these end sections 32 do not move away from or move inward close to the axis A-A'.

The end sections 32 may thus adopt a helical configuration which does not entail detachment of the reinforcing armour elements 29 away from the axis A-A'.

In this example, the annular clamping member 90 substantially covers the entire end section 32 of each armour element 29 up to its free end 34. Each end section 32 is thus placed in engagement with the annular member 90 over substantially the entire length L of the annular member 90.

The retention force FR of the annular member 90 is proportional to the clamping pressure P, taken at the level of the interior surface 96, to the clamping surface S and to the coefficient of friction fr between the annular member 90 and the armour elements 29 according to the following equation:

$$FR = P \cdot S \cdot fr$$

In the case of a cylindrical interior surface 96:

$S = L \cdot \pi \cdot D$, L and D being respectively the length and the internal diameter of the annular member 90.

As a result: $FR = P \cdot L \cdot \pi \cdot D \cdot fr$

Advantageously, in order to provide an adequate retention force, the length L of the annular member 90 is greater than 200 mm.

The annular clamping member 90 is distinctly separate and is axially offset relative to the front sealing assembly 54.

This avoids having to detach the reinforcing armour elements 29 radially away from the axis A-A'. A minimal radial dimension is thus obtained.

The annular clamping member 90 includes a clamping collar 100, applied around the armour layer 25, the collar 100 being capable of passing from a radially expanded configuration for installation-mounting to a contracted configuration for the application of a radial pressure that is greater than 100 bars over the end sections 32 of the reinforcing armour elements 29.

Figure 12:
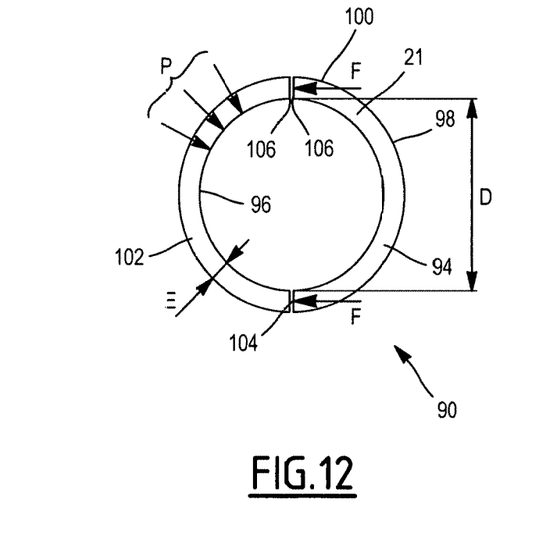
FIG. 12 is a side view of an example of an annular clamping member for an end-piece according to the invention.
Figure 13:
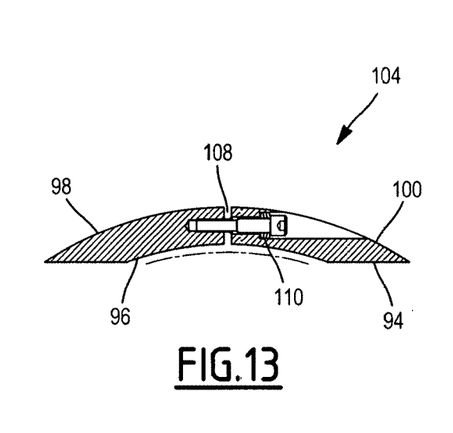
FIG. 13 is a view of a detail from FIG. 12.

In the example illustrated by FIGS. 12 and 13, the clamping collar 100 comprises a plurality of bearing segments 102 that are assembled together therebetween by connecting elements 104.

Each segment 102 has a form shaped like a longitudinal section of cylinder having axis A-A' having an angular span measuring less than 360°, the sum of the angular spans of the segments 102 being substantially equal to 360°.

In the example represented in FIG. 12, the number of segments 102 is equal to 2, with each segment 102 extending over 180°.

By way of a variant, the number of segments 102 is greater than 2, for example equal to N, with each segment 102 extending over an angular span equal to 360°/N.

The lateral edges 106 of each segment 102 extend along a generatrix of the cylinder formed by the annular clamping member 90.

The segments 102 are connected tangentially to one another by their lateral edges 106 by application of a tangential force F generated by the connecting elements 104.

As illustrated by FIG. 13, the connecting elements 104 comprise a plurality of parallel screw/nut systems 108, which are mounted tangentially through the lateral edges 106 of two adjacent segments 102 by being distributed along the length of each lateral edge 106.

In order for applying a given radial pressure P at the level of the interior surface 96, in the event where the thickness E of the collar 100 is significantly less than its internal diameter D, the pressure P follows the following law:

$$P = \frac{2F}{DL},$$

where L is the length of the clamping collar and F is the tangential clamping force of the connecting elements 104.

Advantageously, in order to allow for breathing of the connecting elements 104, and to offset the risk of loosening of the collar 100, which may be linked to the possible creep of the anti-wear strips 36, long stroke spring washers 110, for example, of the Belleville type, are interposed between the screw heads and the nuts, as is visible in FIG. 13.

Figure 14:
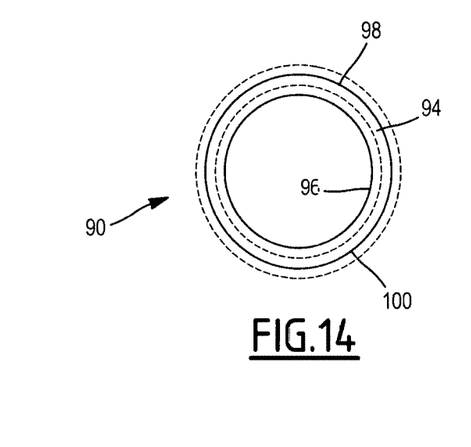
FIG. 14 is a view similar to that in FIG. 13 of another example of an annular clamping member.

In a variant illustrated by FIG. 14, the collar 100 is formed integrally in one single piece over its entire periphery around the axis A-A', from a shape memory material.

The shape memory material advantageously presents a transition temperature that is lower than 0° C. At ambient temperature, the collar 100 has an interior diameter that is smaller than the exterior diameter of the external armour layer 25. During the mounting of the end-piece, the collar 100 is cooled to below the transition temperature, which then makes it possible to greatly increase its internal diameter without the risk of damaging the material. This increase in diameter may for example be brought about by means of an expansion mandrel.

The collar 100 then presents an internal diameter that is substantially greater than that of the external armour layer 25, and is found to be in the expanded configuration of installation-mounting as represented in dotted lines in FIG. 14. Subsequently, the collar 100 is threaded in the expanded configuration around the external armour layer 25, with the temperature of the collar 100 then being required to be maintained below the transition temperature.

Finally, the temperature of the collar 100 is increased up to a value higher than the transition temperature, in practice up to the ambient temperature, which results in the shape memory material being able to regain its original geometry, such that the collar 100 then resumes the retracted clamping configuration, illustrated in solid lines in FIG. 14.

In the example illustrated in FIG. 2, a rear edge 112 of the annular member 90 is wedged axially against a shoulder 114 defined by the cover 51, so as to retransfer to the cover 51 and to the end vault 50 the axial tension forces received by the annular member 90. In addition, the annular member 90 may be attached to the cover 51 by other means, for example by means of screws.

In this example, the cavity 52 is free of any filler material, the absorption of axial forces originating from the armour layers 24, 25 being effected exclusively by means of the annular member 90.

By way of a variant (not shown), a solid filler material, such as a thermosetting polymeric resin of such types as epoxy or araldite is disposed in the chamber 52 around the annular member 90.

Preferably, in order to improve the transmission of forces, the coefficient of friction fr between the armour layer 25 and the annular member 90 is greater than 0.1, advantageously greater than 0.3 and preferably greater than 0.4.

In order to do this, the end sections 32 of the reinforcing armour elements 29 are advantageously stripped down so as to remove the anti-wear strips 36.

This operation is for example carried out prior to the installing in place of the annular member 90, by placing an inductive or heating collar to the right of the rear cannula 86 over the layer of reinforcing armour 25.

This being done, the reinforcing armour elements 29 are released so as to allow for the exterior armour layer 25 to flare out. The ends of the two anti-wear strips 36 of this layer 29 are thus accessible.

The heating collar is then activated so as to reach a temperature of about 100° C. to 150° C. in a rapid fashion in order to limit the diffusion.

The end sections of the anti-wear strips 36 are then torn by taking advantage of the locally reduced mechanical strength.

This operation is in addition also repeated for the internal armour layer 24, either with the heating collar in the same place, or by moving it towards the front in an incremental manner in order to minimise the thermal resistance and therefore the heating time.

The tear obtained is advantageously localised at the rear of the annular member 90. This method averts any mechanical intrusion that is likely to create local defects on the reinforcing armour elements 29.

Advantageously, the reinforcing armour elements 29 are degreased, in order to increase the coefficient of friction of the surface thereof at the level of the end section 32.

Preferably, at least one intermediate friction layer 92 is arranged between the annular member 90 and the armour layer 25, and/or between the annular member 90 and the cover 51 and/or between the layers of reinforcing armour 24, 25.

In certain cases, the intermediate friction layer 92 increases the coefficient of friction up to at least 0.35.

The intermediate layer 92 may be made of composite material, polymer material or metallic material.

It is for example formed of a strip of a material used to make the friction linings in brake systems. Such a material is for example marketed by the company Bremskerl in the form of an asbestos free lining having a coefficient of friction with steel of the order of 0.35.

The presence of at least one intermediate friction layer 92 substantially increases the retention force provided by the fastening assembly 58 by limiting its length.

By way of example, an annular member 90 having a length equal to 0.3 m and clamping at 200 bars the reinforcing armour elements 29 having a diameter of 0.3 m with a coefficient of friction of 0.35 is capable of absorbing a tension of the order of 200 t.

The assembly of the end-piece 14 according to the invention is carried out as follows.

Initially, the various different layers of the pipe 10 are cut to the appropriate length in order to make apparent on the pressure vault 28, a free end section 32 of the armour layers 24, 25.

In the example shown in FIG. 2, the free end sections 32 are received in a cylindrical casing envelope, and therefore do not undergo any torsion or twisting during their installation in place.

The downstream sealing assembly 56 is then installed in place by positioning the cannula 86 between the exterior sheath 30 and the exterior armour layer 25.

Preferably, a friction layer 92 is disposed around the end sections 32.

Then, the annular member 90 in its expanded configuration is introduced around the armour layer 25, with the interposing of the friction layer 92.

The end vault 50 and the front sealing assembly 54 are subsequently installed in place.

The annular member 90 is then moved to its retracted configuration in order to apply a radial pressure greater than 100 bars on the end sections 32 of the reinforcing armour elements 29.

The armour layers 24, 25 are then secured to the annular member 90 by clamping.

Then, the front sealing assembly 54 is activated by clamping. The cover 51 is then positioned and is placed in engagement around the annular member 90, before being fastened on to the vault 50.

The downstream sealing assembly 56 is then activated by clamping on the cover 51.

In operation, when the end-piece 14 is mounted on to another end piece, or on a surface assembly, the axial stress transmitted by the armour layers 24, 25 resulting from the weight of the pipe 10 is absorbed radially through the annular member 90, preferably by means of the friction layer 92.

On account of the high radial clamping pressure, the forces absorbed are significant and may be transmitted to the cover 51 and/or to the end vault 50 in order to ensure robustness of the end-piece 14.

The reinforcing armour elements 29 then have end sections of 32 that are maintained in place by the annular member 90 in a cylindrical casing envelope, without radial flaring. The initial risk of damage for each armour element 29 is therefore very limited, which increases the resistance of the end-piece 14 to a very high average axial tension, but also to variations in axial tension oscillating around the average tension in a large number of tension variation cycles.

The robust attachment of the end sections 32 of the reinforcing armour elements 29 may even be obtained in this case without filler material being injected into the chamber 52.

Figure 4:
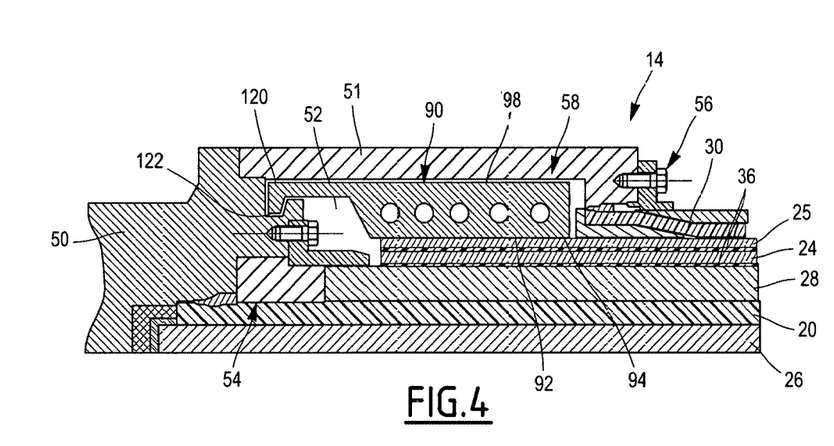
FIG. 4 is a view similar to that in FIG. 2 of a second end-piece according to the invention.

A second end-piece 14 according to the invention is illustrated in FIG. 4.

Unlike the first end-piece 14 represented in FIG. 2, the annular member 90 of this end-piece 14 comprises at least one axial attachment member 120 for attachment on the end vault 50. This attachment member 120 is for example formed by a hook received in a corresponding radial groove 122 formed in the vault.

In this case, the axial contact between a rear edge of the annular member 90 and the cover 51 is no longer necessary. The axial forces transmitted by the armour layers 24, 25 to the annular member 90 are directly absorbed by the cooperation between the attachment member 120 and the corresponding groove 122 of the vault 50.

Figure 5:
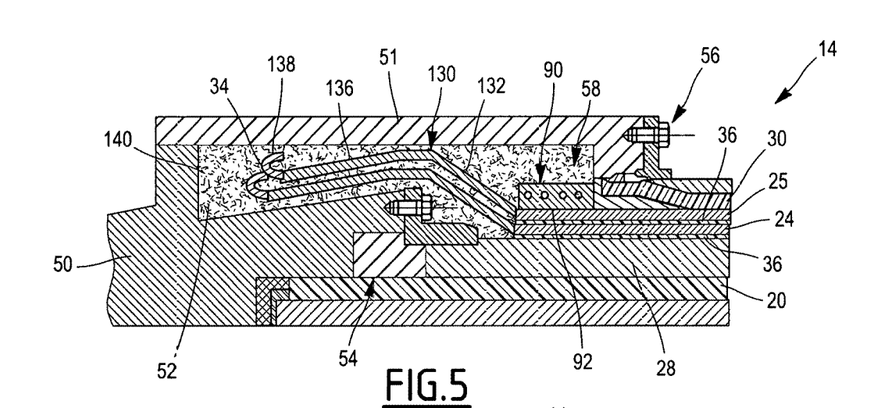
FIG. 5 is a view similar to that in FIG. 2 of a third end-piece according to the invention.

A third end-piece 14 according to the invention is illustrated in FIG. 5.

Unlike the first end-piece 14 illustrated in FIG. 2, the annular member 90 partially overlaps the end section 32 of each armour element 29, in the vicinity of the rear edge 74 of the cover 51.

At least one portion 130 of the free end of each armour element 29 protrudes out towards the front beyond the annular member 90.

Each free end portion 130 has a rear region 132 extending radially away from the axis A-A' by moving towards the front, a front region 136 approaching radially closer towards the axis A-A' by moving towards the front and an attachment member 138 situated at the free end 34 of the armour element 29.

The fastening assembly 58 then includes a filler material 140 such as previously defined above, the material 140 filling the chamber 52 in order to embed the portion 130 of each armour element 29 and to axially secure it relative to the vault 50 and to the cover 51.

In this example, the exterior surface 98 of the annular member 90 is located radially away from the cover 51. The filler material 140 is disposed in the annular space defined between the exterior surface 98 and the cover 51.

In this end-piece 14, the annular member 90 partially absorbs the axial tension transmitted by the armour layers 24, 25. It absorbs for example between 5% and 50% of the axial tension transmitted by the armour layers 24, 25. Advantageously, the annular member 90 absorbs between 15% and 50% of the axial tension transmitted by the armour layers 24, 25.

In the case where the annular member 90 only partially absorbs the axial tension transmitted by the armour layers 24, 25, the invention could also function when the radial clamping pressure towards the central axis A-A' applied by the annular member 90 of the reinforcing armour elements 29 is less than 100 bars, for example between 50 bars and 100 bars.

When the annular member 90 absorbs only a very small proportion of the axial tension, for example less than 30% of the axial tension, it is in effect possible to compensate for a reduction in the clamping pressure by an increase in the length of the annular member 90 while also maintaining an acceptable overall dimensional profile.

The annular member 90 being situated at the rear of the free end portion 130, the stress in the reinforcing armour elements 29 and the axial displacements of the latter are significantly reduced at the zone of detachment at the start of the rear region 132.

This greatly reduces the phenomenon of fatigue which may be observed at the zone of detachment of the reinforcing armour elements 29, since the stresses are lower, and the displacements are reduced.

Thus, by placing the zone of detachment of the reinforcing armour elements 29 at the front of the annular member 90, the problem of fatigue of the reinforcing armour elements is resolved, without there being any need for absorption of the entire load by making use of the annular member 90.

The length of the annular member 90 may then be reduced, in particular when the tensions on the end-piece 14 reach several hundreds of tonnes, sometimes more than 1000 t.

This makes it possible to keep the length L of the end-piece 14 relatively small, while also effectively ensuring absorption of the load.

Figure 6:
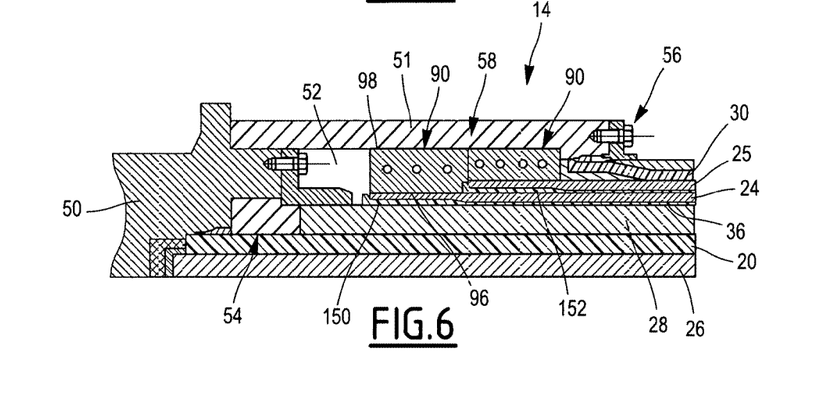
FIG. 6 is a view similar to that in FIG. 2 of a fourth end-piece according to the invention.

A fourth end-piece 14 according to the invention is illustrated in FIG. 6. In contrast to the first end-piece 14 illustrated in FIG. 2, this end-piece 14 comprises a single individual annular member 90 associated with each armour layer 24, 25.

Thus, the reinforcing armour elements 29 of the interior armour layer 24 extend towards the front beyond the reinforcing armour elements 29 of the exterior armour layer 25.

A first annular clamping member 90 is applied over the interior armour layer 24. A second annular clamping member 90 is applied in a manner to be adjacent to the first annular clamping member 90 over the exterior armour layer 25.

The annular clamping members 90 are placed axially into contact with each other.

Preferably, a friction layer 92 is disposed between each armour layer 24, 25 and the annular member 90 disposed over the respective layer of reinforcing armour 24, 25.

Advantageously, a first support cannula 150 for clamping is interposed between the end sections 32 of the reinforcing armour elements 29 of the first armour layer 24 so as to be facing the first annular member 90. A second clamping support cannula 152 is interposed between the first layer of reinforcing armour 24 and the end sections 32 of the armour elements 29 of the second layer of reinforcing armour 25, so as to be facing the second annular member 90.

The cannulas 150, 152 are advantageously cylindrical or conical so as to respect the natural angle of flaring associated with the spring return after the holding strips for holding in place the armour members 29 have been released during the assembly and mounting of the end-piece 14.

The cannulas 150, 152 make it possible to obtain a better clamping support and avoid damaging the pressure vault 28 during the clamping.

Such an arrangement reduces the length of attachment or increases the tension absorbed, since each armour layer 24, 25 is clamped in an independent fashion.

Figure 7:
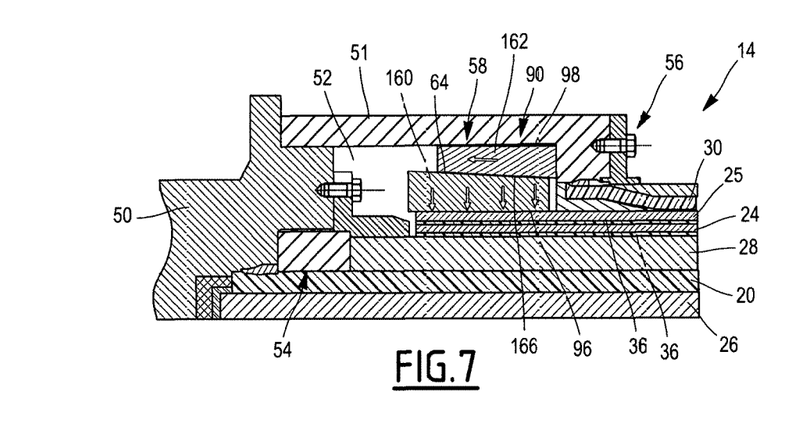
FIG. 7 is a view similar to that in FIG. 2 of a fifth end-piece according to the invention.

A fifth end-piece 14 according to the invention is illustrated in FIG. 7.

Unlike the first end-piece 14 illustrated in FIG. 2, the annular member 90 has a conical interior ring 160 delimiting the interior surface 96 disposed in contact with the end section 32 of the armour layer 25.

The annular member 90 also comprises an exterior clamping ring 162 capable of clamping the interior ring 160 radially towards the axis A-A' by means of a wedge effect.

Thus, the interior ring 160 has a conical exterior bearing surface 164 disposed to be facing a conical interior bearing surface 166 of the exterior ring 162.

The exterior ring 162 delimits an exterior surface 98 for contact with the cover 51.

The relative displacement of the exterior ring 162 parallel to the axis A-A' along the interior ring 160 causes a radial displacement of the interior ring 160 which generates a radial clamping pressure on the layers of reinforcing armour 24, 25. According to invention, this radial pressure is greater than 100 bars.

Such an annular member 90 has the advantage of creating a major radial pressure.

In the example shown in FIG. 7, the exterior bearing surface 164 of the interior ring 160 and the interior bearing surface 166 of the exterior ring 162 converge towards the axis A-A' by moving towards the rear.

This system is thus self-tightening, without limitation of the clamping forces on the armour layers 24, 25, and on the pressure vault 28.

By way of a variant (not shown), in order to control the clamping, the exterior bearing surface 164 of the interior ring 160 and the interior bearing surface 166 of the exterior ring 162 converge towards the axis A-A' in the direction of the front. In this case, the exterior ring 162 is locked in translational motion for example by a pin, so as to maintain the clamping.

Figure 8:
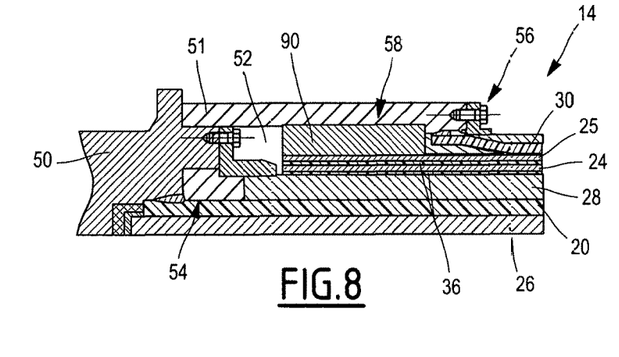
FIG. 8 is a view similar to that in FIG. 2 of a sixth end-piece according to the invention.
Figure 9:
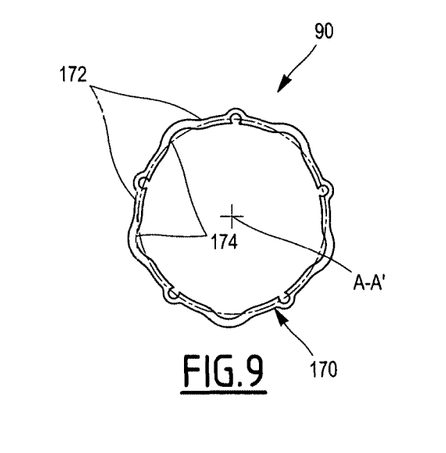
FIG. 9 is a front view of an annular clamping member for clamping the armour wires in the sixth end-piece according to the invention.

A sixth end-piece 14 according to the invention is shown in FIGS. 8 and 9.

Unlike the first end-piece 14 shown in FIG. 2, the annular clamping member 90 of the sixth end-piece 14 comprises a ring 170 that is deformed locally on selected angular sectors about the axis A-A'.

Thus, when it is disposed in an active manner in contact with the armour layers 24, 25, the deformed ring 170 includes a plurality of first angular regions 172 applied and tightened on to the end sections 32 of the armour layer 25.

The deformed ring 170 in addition comprises a plurality of second angular regions 174 disposed between the first angular regions 172, with the second angular regions 174 not being applied and tightened on to the end sections 32 of the armour layer 25.

In order to deform the ring 170, and create the first angular regions 172 applied and tightened on to the end sections 32, a machine of such type as the "radial crimping" machine, comprising a plurality of radial clamping fingers is for example used.

This crimping method for radial crimping of the ring 170 is rapid, reproducible, easy to implement, and provides the ability to obtain a radial clamping pressure of about 300 bars.

The radial clamping pressure being high, it is advantageous to insert under the end sections 32 of the reinforcing armour elements 29 a support cannula of such type as that shown in FIG. 6, the support cannula being disposed to be facing the ring 170 clamped by radial crimping. This variant combining the use of a support cannula and a ring tightened by radial crimping makes it possible to reduce the manufacturing cost of the end-piece 14.

By way of a variant, the second angular regions 174 are made out of a shape memory material having a form that presents a first expanded or deployed configuration, in the circumferential extension of the first regions 172, and a second contracted configuration, bulging radially towards the exterior, as shown in FIG. 9.

Figure 10:
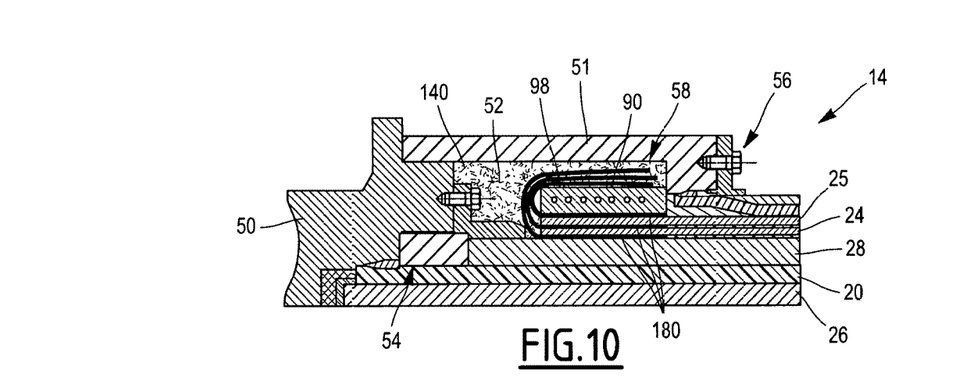
FIG. 10 is a view similar to that in FIG. 2 of a seventh end-piece according to the invention.

A seventh end-piece 14 according to the invention is shown in FIG. 10.

Unlike the first end-piece 14 illustrated in FIG. 2, the additional armouring wires 180, advantageously made out of carbon or steel, are coupled between the reinforcing armour elements 29, so as to be facing the end sections 32.

These additional armouring wires 180 are interposed between the pressure vault 28 or the pressure sheath 20 and the interior armour layer 24 and/or between the interior armour layer 24 and the exterior armour layer 25 and/or between the exterior armour layer 25 and the annular member 90.

Each reinforcing armouring wire 180 is rolled up around the front edge of the annular member 90 and along the exterior surface 98 of the annular member 90.

Each reinforcing armouring wire 180 here has a rear end disposed in the end-piece 14 so as to be axially facing the cover 51, advantageously under the rear edge of the annular member 90.

A solid filler material 140 is arranged in the reception chamber 52 so as to embed the armouring wires 180 and enter into contact with the end vault 50 and with the cover 51.

This provides for spreading the tension forces over at least four layers, namely two layers of reinforcing armour 24, 25 coupled with two or three layers of armouring wires 180.

The annular member 90 shares the tension force over all of the wires situated at the front of the member 90, which thereby makes it possible to apply a lower rate of strain over the reinforcing armour elements 29 of the layers of reinforcing armour 24, 25.

In the example shown in FIG. 10, the end sections 32 of the reinforcing armour elements 29 are substantially completely covered by the annular member 90.

Figure 11:
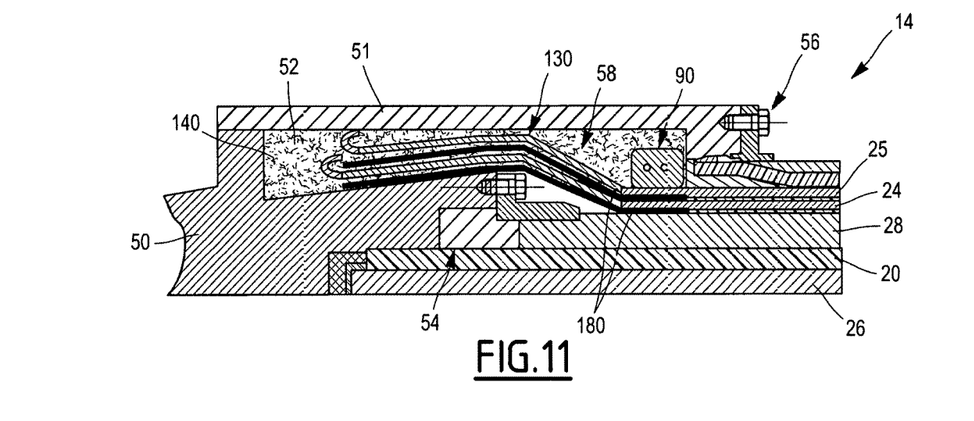
FIG. 11 is a view similar to that in FIG. 2 of an eighth end-piece according to the invention.

The eighth end-piece 14 according to the invention, illustrated in FIG. 11, differs from the seventh end-piece 14 represented in FIG. 10 in that, in an analogous manner to the third end-piece 14 represented in FIG. 5, a portion 130 of the end section 32 of each armour element 29 protrudes out beyond the annular member 90.

The additional armour wires 180 are not rolled up around the annular member 90, but are disposed between the parts that protrude out 130 of the end section 32.

In one variant (not shown) of the end-piece 14 shown in FIG. 10, longitudinal inserts made out of carbon fibre based composite material or of steel are interposed at the rear between the annular member 90 and the reinforcing armour layers 24, 25 and protrude out towards the front in the filler material 140.

Thus, while the end sections 32 of the reinforcing armour elements 29 stops at the annular member 90, a portion of the stress is transferred to the inserts in the filler material 140, either only by friction, or aided in terms of shear stress by beads added by bonding, or directly machined in the insert.

Figure 15:
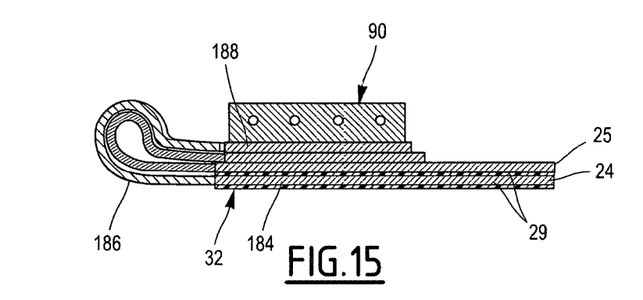
FIG. 15 is a view of a detail of a variant of an armour element for an end-piece according to the invention.

In the variant illustrated in FIG. 15, each end section 32 of an armour element 29 is folded over itself in a loop, under the annular member 90.

Each end section 32 thus includes a rear interior portion 184 disposed under the annular member 90, a front portion 186 folded in a loop and a rear exterior portion 188 arranged radially between the rear interior portion 184 and the annular member 90.

In the example shown in FIG. 15, the rear exterior portions 188 are placed in contact with the rear interior portions 184.

Figure 16:
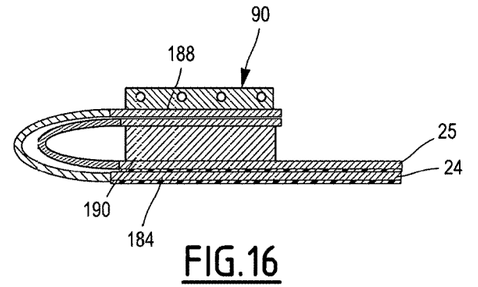
FIG. 16 is a view similar to that in FIG. 10 of another variant of an armour element for an end-piece according to the invention.

In the example shown in FIG. 16, an intermediate collar 190 is interposed between the rear interior portions 184 and rear exterior portions 188.

The front portion 186 is embedded in the filler material 140.

By way of a variant, a piece of cylindrical section (not shown) is placed within the interior of the loop formed in the front portion 186 in order to control the folding radius.

This arrangement of the end sections 32 decreases the anchoring length or increases the tension absorbed.

Thanks to the invention which has just been described, it is possible to maintain the reinforcing armour elements 29 in their initial state, without any change in their state of stress.

In the embodiments shown in FIGS. 2, 4, 6, 10, the folding/unfolding of the reinforcing armour elements 29 at their end sections 32 is deleted and it is not necessary to form attachment-engagement elements at the level of the free ends 34 of the armour elements 29.

In addition, the end sections 32 are contained in a cylindrical casing envelope with a constant radius, which eliminates the risk of winding/unwinding of the reinforcing armour elements 29 at the level of their flaring when they are subjected to very considerable variations in tension.

This makes it possible to eliminate the weak points over the fatigue strength, and decrease the time of assembly of the end-piece 14.

Thus, the annular member 90 may by itself alone absorb all of the rated tension of the end-piece 14, without increasing in a significant manner the anchoring length.

In some cases, the filler material 140 may even be omitted in the chamber 52.

By way of example, an annular member 90 having a length L of 1 m, and applying a radial clamping pressure P of 200 bars on the end sections 32, considering a coefficient of friction of 0.1 between the annular member 90 and the end sections 32 allows an absorption of tension of 63 t for a structure with diameter measuring 100 mm, and 189 t for a structure with diameter measuring 300 mm.

The use of an additional friction layer 92 with a coefficient of friction greater than 0.1, in particular greater than 0.3, increases the tension absorbed and/or decreases the length of the annular member 90.

Thus, with an annular member measuring only 0.3 m in length, which exerts a radial pressure P of 200 bars on the end sections 32 for a diameter of 0.3 m, with a coefficient of friction of 0.35, a tension of the order of 198 t is absorbed.

On the surface, the clamping of the annular member 90 at a radial pressure that is greater than 100 bars is applicable directly on the pressure vault 28, with no particular reinforcement, because it is of the same order as the hydrostatic stress to which the flexible pipe 10 is subjected at its maximum depth.

As has previously been seen above, for applications in deep water, when the tension taken on increases further, it is possible to only partially absorb one part of the axial tension by making use of the annular member 90, and to absorb the rest of the axial tension with an anchoring by embedding as has been described in the FIG. 5 or 11.

In this case, the presence of the annular member 90 very considerably limits the stresses and displacements in the zone of separation of the parts 130 that protrude out, of the reinforcing armour elements 29, which solves the problem of fatigue, without having to significantly increase the length L of the annular member 90.

The invention claimed is:

1. A connection end-piece for connecting a flexible pipe for transporting fluid, the flexible pipe comprising at least one pressure sheath and at least one tensile armour layer disposed externally relative to the pressure sheath, the end-piece comprising:
   an end vault extending along a central axis;
   reinforcing armour elements of the at least one tensile armour layer, the reinforcing armour elements having an end section, the reinforcing armor elements wound with a long pitch and comprising wires or strips;
   an exterior cover fastened on to the end vault and delimiting with the end vault, a reception chamber for receiving the end section of reinforcing armour elements; and
   at least one annular member applied externally over the reinforcing armour elements, the annular member being accommodated at least partially in the reception chamber between the reinforcing armour elements and the exterior cover;
   wherein the annular member applies over the reinforcing armour elements a radial clamping pressure towards the central axis that is greater than 100 bars.

2. The end-piece according to claim 1, wherein a length of the annular member taken along the central axis is greater than 200 mm.

3. The end-piece according to claim 1, wherein a coefficient of friction between the reinforcing armour elements and the annular member is greater than 0.1.

4. The end-piece according to claim 3, wherein the coefficient of friction is greater than 0.3.

5. An end-piece according to claim 3, wherein said free end extends radially towards the interior relative to the annular member, the reception chamber being free of any filler material.

6. The end-piece according to claim 1, further comprising an intermediate friction layer radially interposed between the reinforcing armour elements and the annular member and/or between the annular member and the cover.

7. The end-piece according to claim 6, wherein the reinforcing armour elements have, positioned to face the annular member, an exterior exposed surface placed directly in contact with the intermediate friction layer.

8. An end-piece according to claim 1, wherein the cover extends axially between a front edge fixed on to the end vault and a rear edge disposed away from the end vault, the annular member extending axially away from the end vault in the vicinity of the rear edge.

9. An end-piece according to claim 8, further comprising a front sealing assembly around the pressure sheath, the front sealing assembly being offset axially away from the annular member in the vicinity of the end vault.

10. The end-piece according to claim 1, wherein the annular member has an interior peripheral surface that is cylindrical around the central axis, with the end section of the reinforcing armour elements extending into a cylindrical casing envelope arranged facing the internal peripheral surface.

11. The end-piece according to claim 1, wherein a free end of each armour element extends axially facing the annular member.

12. An end-piece according to claim 1, wherein at least one free portion of an end section of an armour element protrudes out axially towards the end vault beyond the annular member into the reception chamber, the free portion being embedded in a filler material disposed in the reception chamber.

13. An end-piece according to claim 12, wherein the free portion extends away radially from the central axis and/or radially approaches the central axis and/or has an anchoring element disposed in the filler material.

14. The end-piece according to claim 1, wherein the annular member is held in position axially relative to the end vault by being in engagement axially with the end vault or/and by being in engagement radially towards the exterior with the cover.

15. The end-piece according to claim 1, wherein the annular member is selected from a clamping collar having an interior circumferential surface that is substantially continuous about the central axis, a deformed ring or an assembly comprising an interior ring and an exterior ring clamping the interior ring radially toward the central axis by means of a wedge effect.

16. A mounting method for mounting the end-piece according to claim 1, the mounting method including the following steps:
   providing a pipe end including a pressure sheath and at least one reinforcing armour layer disposed around the pressure sheath;
   placing the annular member around and on the exterior of end sections of reinforcing armour elements of the reinforcing armour layer;
   clamping of the annular member in order to apply on the end sections a radial pressure toward a central axis greater than 100 bars;
   setting in position of a cover and an end vault around the annular member in order to define a reception chamber for receiving free ends of the reinforcing armour elements and at least in part the annular member.

17. The method according to claim 16, further comprising interposing an intermediate friction layer between the annular member and the reinforcing armour elements prior to the clamping of the annular member.

18. A method according to claim 16, wherein after the step of clamping, a free portion of at least one armour element protrudes out axially towards the end vault beyond the annular member into the reception chamber, the method comprising the injection of a filler material that is capable of solidifying in the reception chamber in order to embed the free portion.

19. The end-piece according to claim 1, further comprising:

a pressure vault helically wound with a short pitch around the pressure sheath, wherein the reception chamber is configured to receive the pressure vault, wherein the radial clamping pressure is applied directly on the pressure vault.

* * * * *